US012320473B1

(12) United States Patent
Wood et al.

(10) Patent No.: US 12,320,473 B1
(45) Date of Patent: Jun. 3, 2025

(54) CAP FOR A PRESSURE VESSEL

(71) Applicant: Sypris Technologies, Inc., Louisville, KY (US)

(72) Inventors: Michael Wood, Ramsey, IN (US); James Lins, Louisville, KY (US)

(73) Assignee: Sypris Technologies, Inc., Louisville, KY (US)

( * ) Notice: Subject to any disclaimer, the term of this patent is extended or adjusted under 35 U.S.C. 154(b) by 469 days.

(21) Appl. No.: 18/054,647

(22) Filed: Nov. 11, 2022

Related U.S. Application Data

(60) Provisional application No. 63/278,767, filed on Nov. 12, 2021.

(51) Int. Cl.
*F17C 13/06* (2006.01)

(52) U.S. Cl.
CPC ...... *F17C 13/06* (2013.01); *F17C 2205/0311* (2013.01); *F17C 2270/0142* (2013.01)

(58) Field of Classification Search
CPC .............. F17C 13/06; F17C 2205/0311; F17C 2270/0142
See application file for complete search history.

(56) References Cited

U.S. PATENT DOCUMENTS 1,715,792 A * 6/1929 Shrum .................. B65D 59/02 138/96 R
3,038,502 A * 6/1962 Hauk .................... F16L 57/005 81/3.43
3,543,801 A * 12/1970 Pinkham ............... F16L 55/132 220/233
3,672,403 A * 6/1972 Wilson ................ F16L 55/1157 220/315
3,722,549 A * 3/1973 Wilson ................ F16L 55/1157 292/257
4,014,367 A * 3/1977 Milo ..................... F16L 55/115 220/318
4,112,979 A * 9/1978 Widdicombe .......... F16L 47/10 220/302
4,237,936 A * 12/1980 Lollis .................... G01M 3/005 138/90
4,553,567 A * 11/1985 Telander ................ B65D 59/02 138/96 T
5,524,672 A * 6/1996 Mosing .................. B65D 59/00 138/96 T
7,341,161 B2 3/2008 Mcguire
D586,346 S 2/2009 Robinson
7,896,187 B2 3/2011 Haibel
8,251,243 B2 8/2012 Haibel
8,596,484 B1 12/2013 Haibel
8,596,697 B1 12/2013 Haibel
9,056,701 B1 6/2015 Haibel
9,097,346 B1 8/2015 Rowland
(Continued)

OTHER PUBLICATIONS

Provisional U.S. Appl. No. 63/278,767, filed Nov. 12, 2021 titled "Cap for a Pressure Vessel" Nov. 12, 2021.

*Primary Examiner* — David R Deal
(74) *Attorney, Agent, or Firm* — Gray Ice Higdon

(57) ABSTRACT

Present embodiments relate generally to a cap for a pressure vessel. More specifically, but without limitations, present embodiments relate to a cap for a pressure vessel, for non-limiting example a submerged pipeline or other pressurized structure wherein the cap engages a flange and the assembly is removable to open the pressure vessel at the flange.

17 Claims, 5 Drawing Sheets

(56) References Cited

U.S. PATENT DOCUMENTS

| | | | | |
|---|---|---|---|---|
| 10,118,745 | B1 | 11/2018 | Schmidt | |
| 10,543,966 | B2 | 1/2020 | Schmidt | |
| 2006/0138144 | A1* | 6/2006 | Montminy .......... | F16L 55/1157 220/325 |
| 2012/0169041 | A1* | 7/2012 | King ..................... | F16L 55/105 285/239 |

* cited by examiner

CAP FOR A PRESSURE VESSEL

CLAIM TO PRIORITY

This non-provisional patent application claims priority to and benefit of, under 35 U.S.C. § 119(e), U.S. Provisional Patent Application Ser. No. 63/278,767, filed Nov. 12, 2021 and titled "Cap for a Pressure Vessel", all of which is incorporated by reference herein.

BACKGROUND

1. Field of the Invention

Present embodiments relate generally to a cap for a pressure vessel. More specifically, but without limitations, present embodiments relate to a cap for a pressure vessel, for non-limiting example a submerged pipeline or other pressurized structure.

2. Description of the Related Art

Various types of closures and caps are available for pressurized vessels. Some types of rotatable closures may be utilized and other types of closures include a cap structure which may be bolted about the circumference of a pipe flange, in order to close the pressurized vessel.

When these closure structures are located within a body of water, it is desirable that the closure be able to be opened fairly quickly and easily. It may also be desirable to provide a backup option for opening in the event that a primary closure actuator fails.

The information included in this Background section of the specification, including any references cited herein and any description or discussion thereof, is included for technical reference purposes only and is not to be regarded as subject matter by which the scope of the invention is to be bound.

SUMMARY

The present application discloses one or more of the features recited in the appended claims and/or the following features which alone or in any combination, may comprise patentable subject matter.

A cap for a pressure vessel, which may be closed and disposed in a body of water. The cap may be operated with an actuator to open and close a plurality of arcuate segments in order to release a plate from a pressure vessel and remove the plate and remaining assembly, thereby providing access to the pressure vessel. The arcuate segments are actuated by the actuator indirectly, by guide arms which move the segments in a radial direction in order to engage or disengage the pressure vessel.

According to some embodiments, a pipe cap may comprise a plate which is configured to be positioned on a flange, a plurality of arcuate segments which expand to separate and increase an outer diameter of the plurality of arcuate segments, or which retract and decrease the outer diameter of the plurality of arcuate segments, a central shaft operably connected to a plurality of guide arms, a guide arm plate which moves with the central shaft, each of the plurality of guide arms pivotally connected to the guide arm plate, the plurality of guide arms movable with movement of said guide arm plate to radially move each of the plurality of arcuate segments, the plurality of arcuate segments is shaped to retain the plate to the flange when the plurality of arcuate segments are retracted.

In some optional embodiments, the pipe cap may further comprise a connector on an upper surface of each of the plurality of arcuate segments. The pipe cap may further comprise an actuator on a surface of the plate wherein the central shaft may be a part of the actuator. The guide arm plate may be movable by the actuator toward and away from the plate. The guide arm plate may move away from the plate and the plurality of arcuate segments may move radially inward. When the guide arm plate moves toward the plate, the plurality of arcuate segments move radially outward. The actuator may be a linear actuator. The linear actuator may be a fluid actuator or a rotating screw actuator. The fluid actuator may be a hydraulic actuator. The plurality of arcuate segments may be channel shaped in cross-section. The plurality of arcuate segments may disengage the plate and the flange. The cap retains the plate and may be removed from the flange.

In additional embodiments, a pipe cap may comprise a plate configured to be placed on a pipe flange to close a flow path within a pipe, and further comprising a plurality of channel shaped arcuate segments which move radially inwardly or radially outwardly relative to a peripheral edge of said plate and said pipe flange. A central shaft may be connected to a guide arm plate wherein movement of the central shaft causes movement of the guide arm plate. A plurality of guide arms extending from the guide arm plate toward the plurality of channel shaped arcuate segments, wherein movement of the central shaft causes radial movement of the plurality of channel shaped arcuate segments. The pipe cap may further comprise a linkage plate connected to each of the plurality of channel shaped arcuate segments, and a plurality of rods to guide movement of the guide arm plate. Each of the guide arms pivot at a first end and a second end.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

In order that the embodiments may be better understood, embodiments of a cap for a pressure vessel will now be described by way of examples. These embodiments are not to limit the scope of the claims as other embodiments of a cap for a pressure vessel will become apparent to one having ordinary skill in the art upon reading the instant description. Non-limiting examples of the present embodiments are shown in figures wherein:

DETAILED DESCRIPTION

Figure 1:
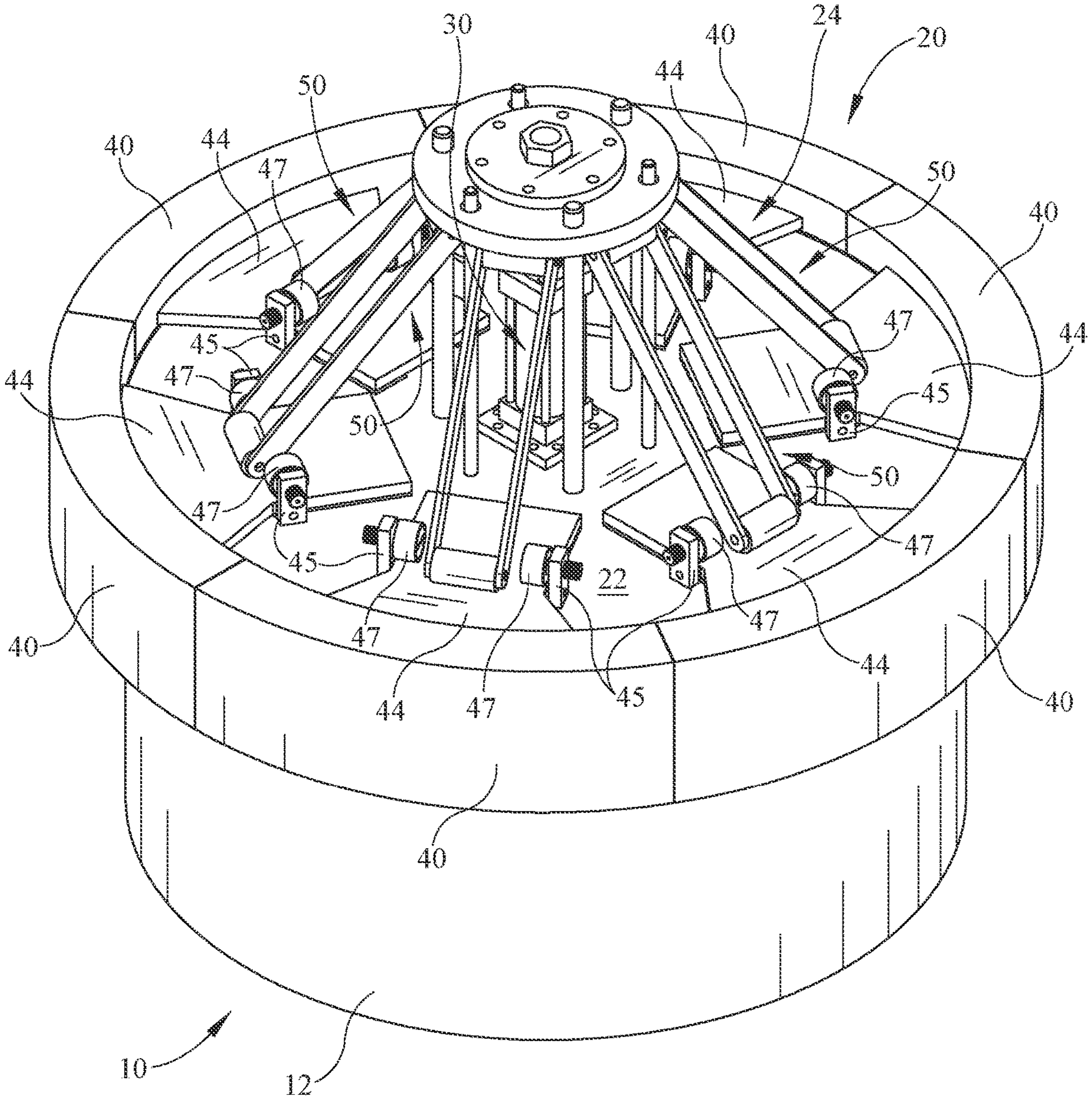
FIG. 1 is a perspective view of a pressure vessel and a cap in a closed position.

It is to be understood that a cap for a pressure vessel is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

It should be understood that the term "pressure vessel" is meant to encompass any type of pressurized system, body, or portion thereof subject to conditions of internal, external, or zero pressure and should not be considered limited to a pipe or any specific vessel.

Referring now to FIGS. 1-5, embodiments of a cap or closure for a pressure vessel are provided. The cap is defined by an assembly which is connected to a pressure vessel in order to close the pressure vessel or open the vessel by removal of the cap. The assembly includes arcuate segments which are movable inwardly and outwardly in order to either close on the pressure vessel or to release from the pressure vessel for removal of the cap.

Figure 2:
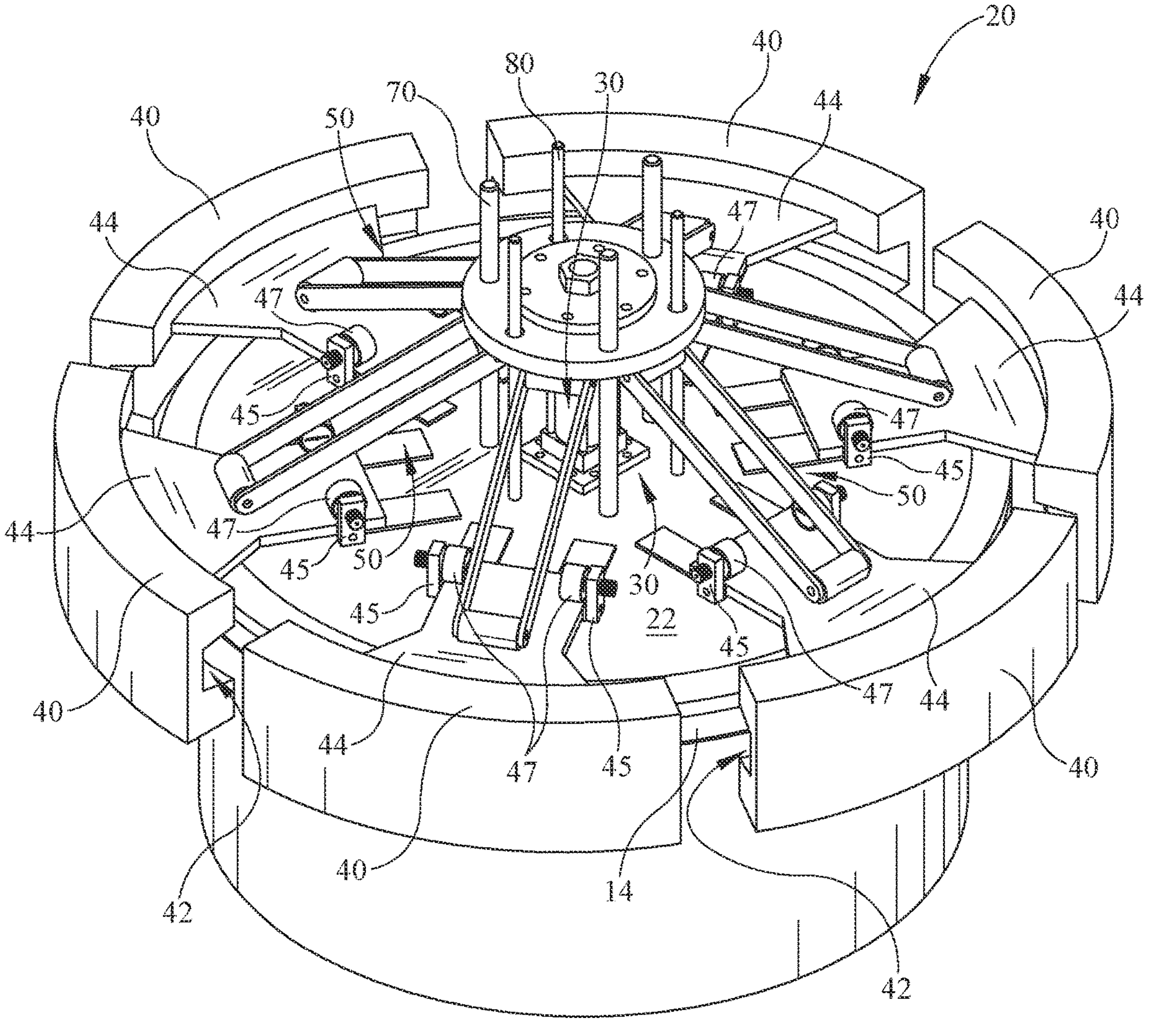
FIG. 2 is a perspective view of a pressure vessel and cap in an open position.

Referring now to FIG. 1, a perspective view of the cap 20 and pressure vessel 10 is provided. The cap 20 is shown in a closed position so that it locked on the pressure vessel 10. The cap 20 may be removable in order to access the interior of the pressure vessel and it is removed and applied as an assembly, which can also be re-used on vessel openings of like size. The pressure vessel 10 may be defined by any of various devices. The instant embodiment provides a pipe 12 and a pipe flange 14 (FIG. 2). However, the pressure vessel 10 may be defined by other devices that may be pressurized and need to be operable and closeable. In some embodiments, for example, the cap 20 may be use in underwater installations, atmospheric, space, or other installation conditions. The cap 20 may be installed in various locations where human access is limited or undesirable. The cap 20 eliminates the need for a diver, for example, to remove individual bolts spaced circumferentially about the perimeter of a closure. This cap design also reduced the likelihood of losing a single bolt or nut of a group of fastening bolts and nuts.

Disposed above the pressure vessel 10 is the cap 20. The cap 20 is defined by a plate 22 which is disposed on the flange 14 to close an opening in the pipe 12. The cap 20 further comprises an assembly 24 which clamps the plate 22 on the pressure vessel 10. With the plate 22 clamped thereon, the pressure vessel 10 is closed. The cap 20 provides a force on the plate 22 to retain it on the pressure vessel 10 to effectuate a seal between the plate 22 and the flange 14. In addition, the cap 20 provides the assembly 24 to move the cap 20 to a second position to release clamping force on the plate 22. Once released, the cap 20 may be removed from the pressure vessel 10 and the interior of the pressure vessel 10 may be accessed. The cap 20 may be connected to the plate 22 so when the cap 20 disengages the pipe flange 14, the cap 20 and plate 22 are removable together.

The assembly 24 comprises a plurality of arcuate segments 40 that move in a radial direction inwardly and outwardly. In the closed position depicted, the arcuate segments 40 engage the plate 22 and pipe flange 14. In this closed position, the arcuate segments 40 are pulled radially inwardly.

Referring now to FIG. 2, a second perspective view of the pressure vessel 10 and the cap 20 is shown. The cap 20 is shown in an open or unlocked position so that the clamping force on the plate 22 is removed and in the position depicted, the cap 20, including plate 22, may be removed.

The cap 20 includes an actuator 30 which moves a plurality of arcuate segments 40 in a radial direction to either engage the plate 22 and pipe flange 14, as shown in FIG. 1, or disengage, as shown in FIG. 2. By comparison of FIGS. 1 and 2, the actuator 30 is shown in an extended position (FIG. 1) which pulls the arcuate segments 40 radially inward to close the cap. Alternately, the actuator 30 is shown in a retracted position in FIG. 2, which forces the arcuate segments 40 radially outward in a released, or open, position. In this position, the segments 40 are radially spaced from the plate 22 and the flange 14. Further, in this position the cap 20 may be removed from the pressure vessel 10.

In this view, the actuator 30 is arranged for linear movement. The linear movement may be purely vertical, or may be rotational, which rotation is converted to linear motion. As a result of the linear motion, the arcuate segments 40 move inwardly or outwardly in a radial direction. Additionally, the actuator 30 may be hydraulic, electric, pneumatic, or other types.

Referring still to FIGS. 1 and 2, located on the plate 22 are cam roller mounts 45 and an associated cam or guide roller 47. The cam roller mounts 45 are fixed to the plate 22 and the cam rollers 47 rotate to guide movement of a linkage plate 44. The cam roller 47 also provides an upper limit during movement of the linkage plates 44.

Figure 3:
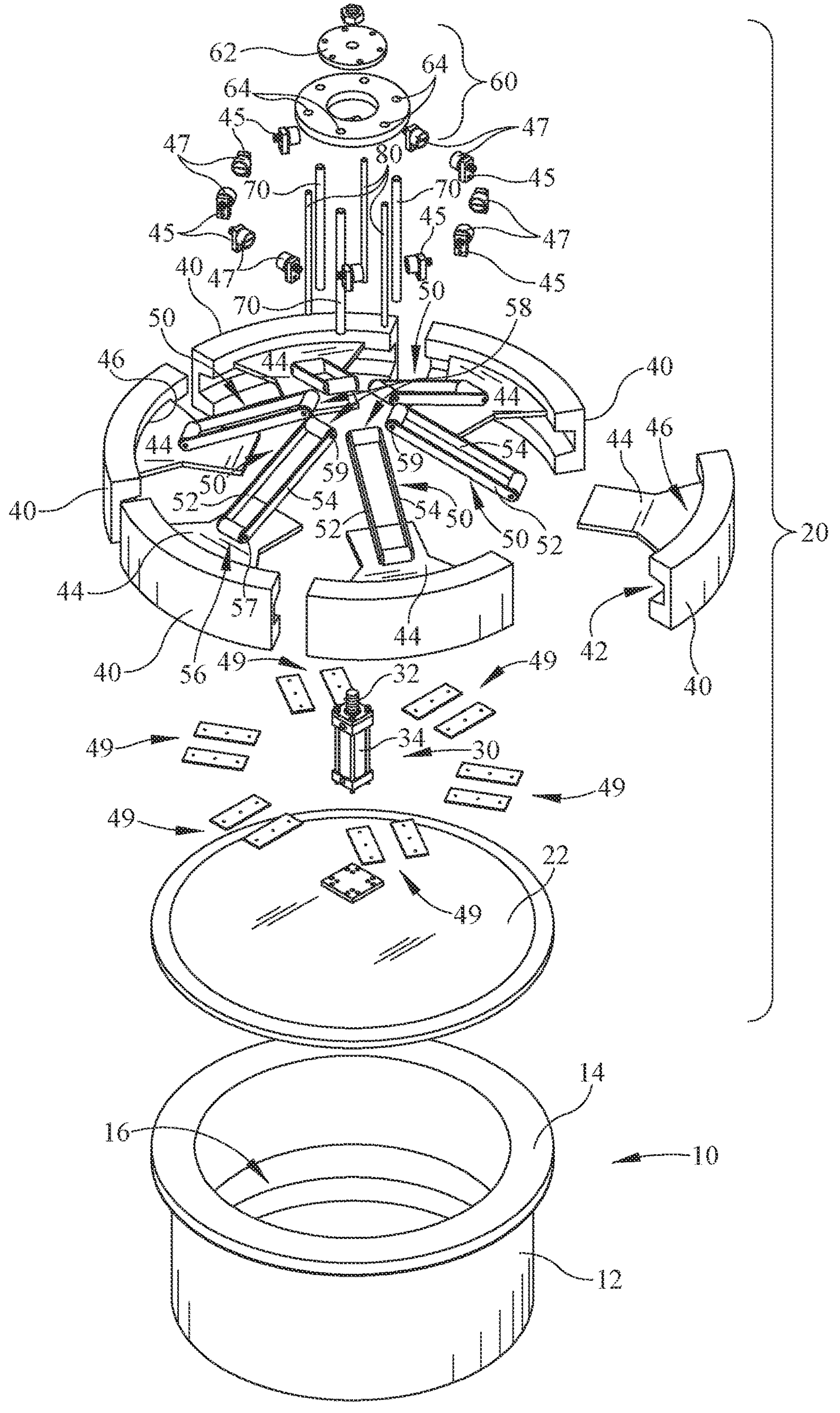
FIG. 3 is an exploded perspective view of the cap assembly.

With reference now to FIG. 3, an exploded perspective view of the pressure vessel 10 and cap 20 are shown. Starting at the bottom of the figure, the pressure vessel 10 is again shown by the pipe 12 and the pipe flange 14. The pipe 12 and pipe flange 14 may be part of a pressure vessel 10, such as a piping system or an alternate pressurized structure.

Disposed above the pipe flange 14, is the plate 22 which seals against the pipe flange 14 to close the pressure vessel 10. The plate 22 is shown as circular and corresponds to the shape and size of an opening 16 of the pressure vessel 10. The plate 22 is larger than the opening 16 so as to close the pressure vessel 10 when the plate 22 is seated. In some embodiments, the plate 22 may comprise a peripheral lip which extends to, or near, the peripheral edge of the flange 14. If the pressure vessel 10 is of a different shape, the plate 22 shape may be altered so as to seal the opening in the pressure vessel 10. The movement of the arcuate segments 40 retains the plate 22 to the flange 14.

Disposed above the plate 22 is an actuator 30. The actuator 30 may be a linear actuator, for example a fluid (gas or liquid) actuator or a rotation-to-linear motion type, such as a threaded rod, turnbuckle, or the like. The actuator 30 depicted may, for example, be a hydraulic actuator with a central piston or shaft 32 that moves linear, for non-limiting example vertical in the depicted orientation, relative to a cylinder 34. It should be understood however that an alternate orientation, for example horizontal orientation, is capable and within the scope of this disclosure, depending on the arrangement of the pressure vessel 10. The actuator 30 is affixed to the plate 22 so that the assembly 24 is connected to the plate 22 and moves relative to the plate 22. It should also be understood that other types of actuators may be utilized and the depicted embodiment is merely one example.

Disposed above the actuator 30 are a plurality of arcuate segments 40. The arcuate segments 40 may, in some embodiments, have a channel or slot 42 with an arcuate shape along a periphery thereof. Specifically, the channel 42 is facing radially inwardly toward the plate 22 and the flange 14. The sum of the arcuate segments 40 define a circumferential shape which surrounds the plate 22 and the flange 14. When in the closed, or retracted position, the arcuate segments 40 are sized to engage the plate 22 and the flange 14, for example along the outer periphery. When in the open, expanded position, the arcuate segments 40 are sized to be positioned radially outwardly of the plate 22, so as to disengage from the plate 22 and remove any pressure or force from the plate 22 and the pipe flange 14.

The arcuate segments 40 each comprise a linkage plate 44. The linkage plate 44 may be various shapes and may be some structure other than plate-like, but in the instant embodiment has an arcuate edge 46 which is disposed along the interior edge of the arcuate segment 40. The arcuate edge 46 connection increases the contact points along each of the arcuate segments 40 to increase the area along which the force is applied to move the arcuate segments 40 radially inwardly and outwardly. Additionally, the flared portion of linkage plate 44 disperses radial force along the circumferential length of the arcuate segments, which aids in alignment of the segments 40, and ensuring a more purely radial motion. The plates 44 also allows connection of guide arms 50, for guided movement of the segments 40. The plates 44 taper from a longer arcuate direction at the segment 40 toward a narrower dimension toward the center of the plate 22. The radially inward ends of the plates 44 are cut off to provide clearance for the actuator 30.

Below the linkage plate 44, are a plurality of guide pads 49. The guide pads 49 are rectangular in shape and in some embodiments, the guide pads 49 are oriented in radial directions on the upper surface of the plate 22. The guide pads 49 may be formed of various shapes and be oriented in various ways to provide for slidable engagement with the linkage plate 44. The guide pads 49 may be formed of a low friction material, such as a polymer or a self-lubricated oil-impregnated bronze, so that the linkage plates 44 are not sliding against plate 22. The guide pads 49 may be located on the upper surface of the plate 22 providing a lower bound for the linkage plates 44 and allowing sliding movement of same. The cam rollers 47 provide an opposite upper bound for the linkage plates 44 so that the motion of the linkage plates 44 is generally horizontal (radial) and perpendicular related to the movement of the actuator 30. Guide pads may also be located along the vertical sides of the mounts 45 to reduce friction of movement of the linkage plates 44 that contacts the mounts 45. The stroke of the actuator 30 and length and angle of the guide arms 50 have a relationship to the movement distance of the linkage plates 44.

The cap 20 further comprises a plurality of guide arms 50 spaced circularly above the arcuate segments 40 and the linkage plates 44. The guide arms 50 may be of various structures and in some embodiments may be each defined by two parallel members 52, 54. At one end 56 of each guide arm 50, a pivot connection 57 is disposed at each linkage plate 44. The pivot connections 57 are each fixed to a linkage plate 44, such that the arms 50 can pivot relative to the pivot connections 57 and the linkage plates 44.

At the opposite end 58 of each guide arm 50, is a second pivot connection 59. The second pivot connection 59 is connected to the guide arm plate 60. The second pivot connection 59 may be fixed to the guide arm plate 60, while the guide arm 50 also pivots relative to the pivot connections 59 and/or the guide arm plate 60. With the guide arms 50 each connected to the guide arm plate 60 and the linkage plate 44, vertical movement of the guide arm plate 60 causes movement of the arcuate segment 40. Specifically, the guide arm 50 translates during pivoting and vertical movement. Each arcuate segment 40 moves radially with translational movement of a corresponding guide arm 50.

The guide plate 60 may be connected to the piston or central shaft of the actuator 30. The guide plate 60 moves upwardly (outwardly) and downwardly (inwardly) relative to the plate 22 and perpendicularly relative to the arcuate segments 40 with movement of the actuator 30. The guide plate 60 is shown as a circular plate, but may be various shapes and is connected directly or by a second plate 62 to the actuator 30.

The guide plates 60, 62 may have one or more apertures 64 which connect or receive guides 70 to guide and limit motion of the guide plate 60, 62 to a single axis of motion. In the depicted embodiment, the guides 70 may be in the form of rods or dowels, for non-limiting example. Further, the guides 70 may be vertically oriented so that the guide plates 60, 62 moves linearly with the actuator 30 and along the guides 70.

Additionally, positioned about the guide plates 60, 62, and extending through holes similar to guides 70 are threaded rods 80. The threaded rods 80 may be the same or different size from the guides 70. In some embodiments, as depicted, the threaded rods have a smaller diameter but the corresponding holes 64 of plate 60 are nearly the same size. The threaded rods 80 may pass through the guide plate 60 without engaging the plate 60 to allow for movement of the guide plate 60 relative to the guides 70 as previously described.

The threaded rods 80 may comprise a nut or other threaded structure which may be raised or lowered to manually to raise and lower the plate 60. For example, with a nut located on each threaded rod 80 below plate 60, each nut may be rotated and moved upwardly along the threaded rod 80, forcing the plate 60 upward to retract the segments 40 and close the cap 20. Oppositely, nuts may be located above the plate 60 on the threaded rod 80, and force the plate 60 downward to move the arcuate segments 40 radially outward, to open the cap 20. Various types of threaded features may be utilized in order to move the guide plates 60, 62.

Plate 62 is removable from plate 60 and actuating piston 32 so that the linkage plates 44 and arcuate segments 40 can be actuated in the event of the failure of actuator 30. Threaded rods 80 may be, for example, all-thread rods made of common metals that are fixed to plate 22. This allows the removal of arcuate segments 40 and thus the cap 20 by means of human or ROV intervention.

Figure 4:
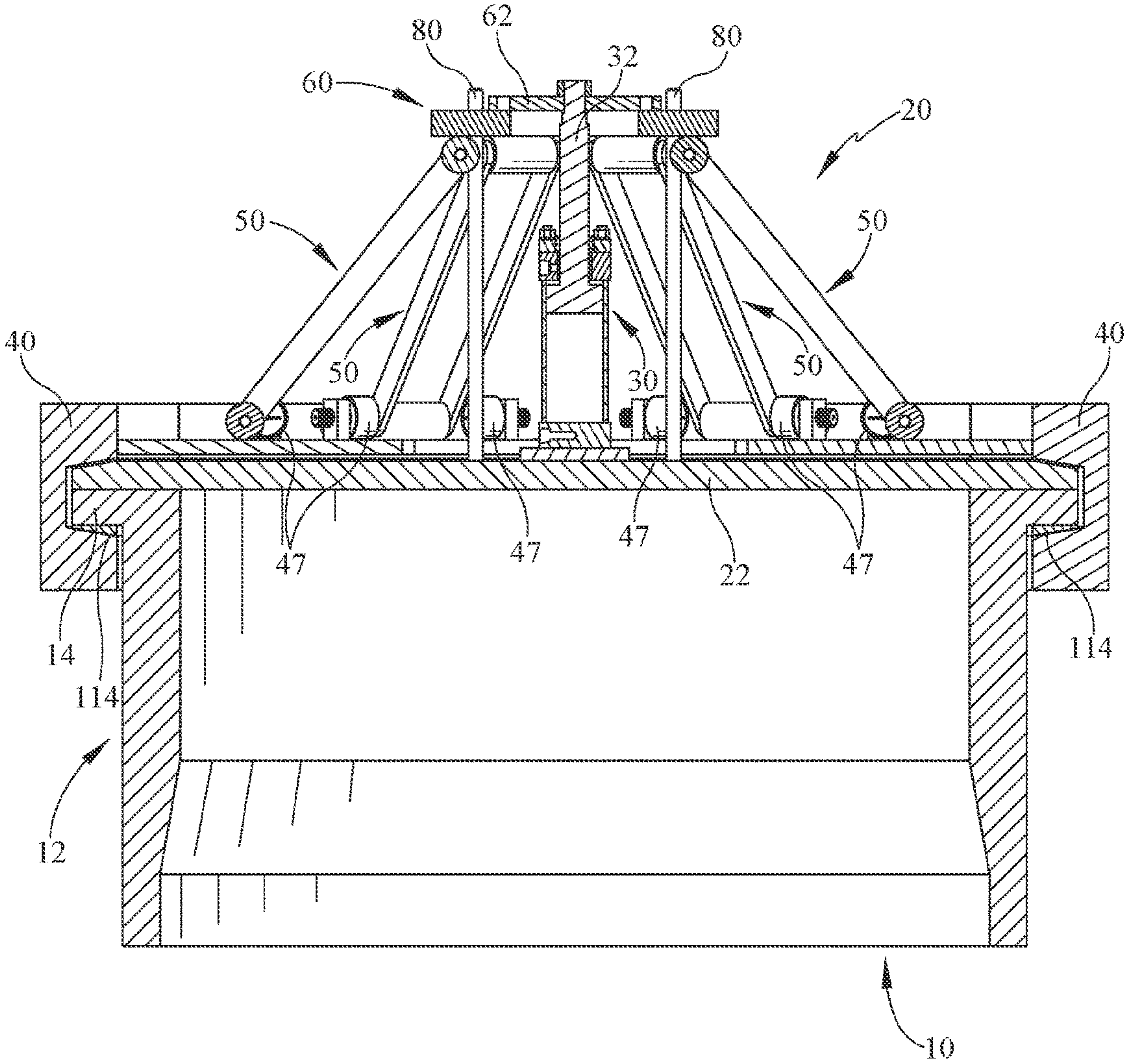
FIG. 4 is a first section view of the pressure vessel in a closed position; and, FIG. 5 is a second section view of the pressure vessel in an open position.

Referring now to FIG. 4, a section view of the cap 20 is shown in a first position. The view of FIG. 4 corresponds to the position shown in the perspective view of FIG. 1. The actuator 30 is extended, and more specifically, the central shaft or piston 32 is extended further away from the plate 22. With the guide plate 60 moved further upward, the guide arms 50 move with the guide plate 60, 62 and pull the arcuate segments 40 radially inward. The arcuate segments 40 are shown pulled radially inward and engaging the plate 22 and the pipe flange 14.

This places a clamping force on the plate 22 and the flange 14. The channel shape 42 of the arcuate segments 40 places a force on the plate 22 and the pipe flange 14 about the periphery of both. Thus a circumferential force is provided rather than a point force.

Also shown in this view, the upper ends 58 of the guide arms 50 are shown connected to the guide plate 60. In some embodiments, the guide arms 50 are connected at an undersurface of the guide plate 60.

Figure 5:
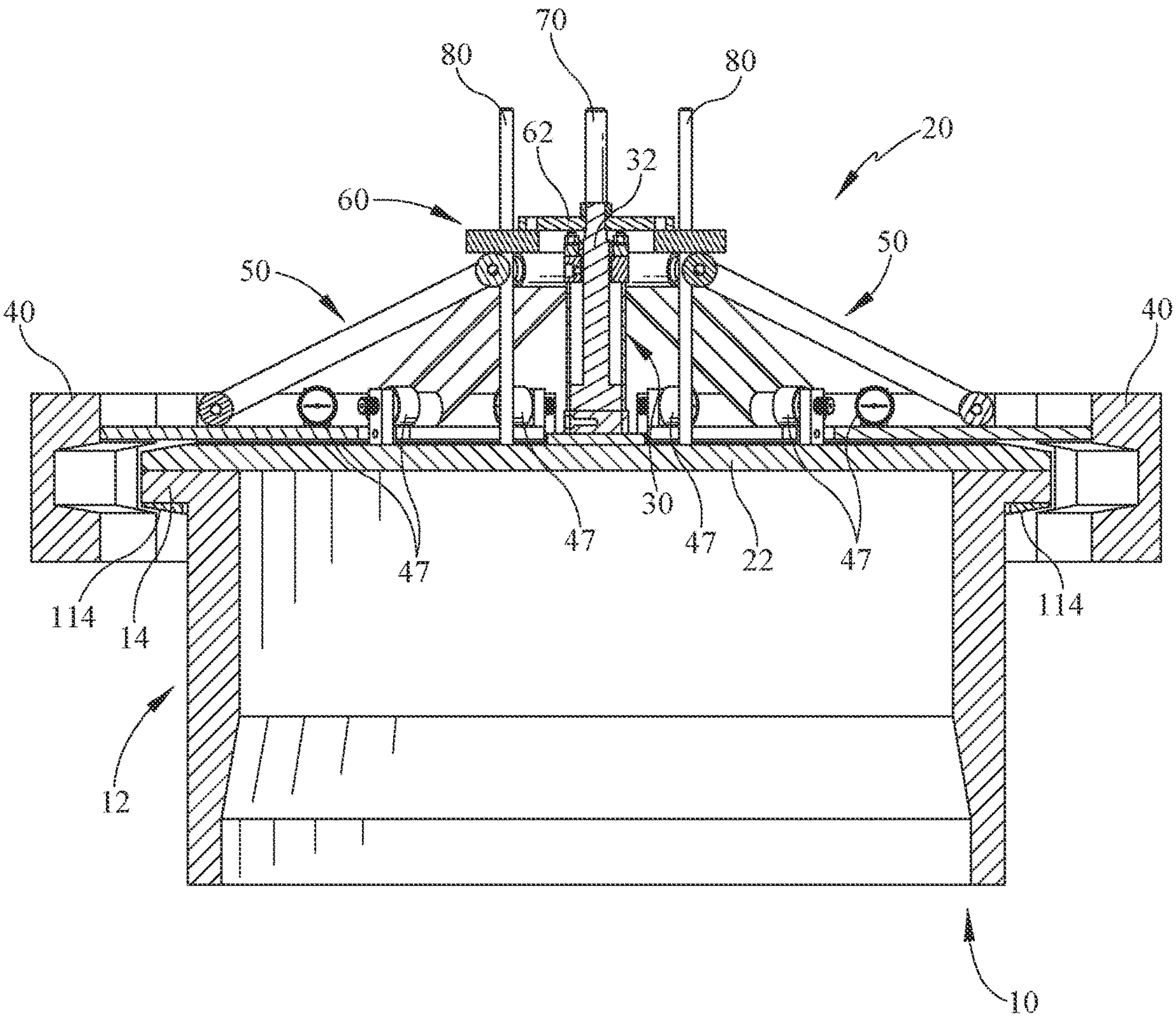

Referring now to FIG. 5, a section view of the cap 20 is shown in a second position, also shown in FIG. 2. The actuator 30 is shown in a retracted position, and more specifically, the central shaft or piston 32 is retracted toward the plate 22. With the guide plate 60, 62 closer to the plate 22, the guide arms 50 are pushed down, toward the plate 22, and the opposite ends of the guide arms 50 push the arcuate segments 40 radially outward from the peripheral edge of the plate 22 and pipe flange 14. As shown, in this second position, the arcuate segments 40 move radially outward enough to clear the OD of the plate 22 and pipe flange 14.

Further, with the guide plate 60, 62 in the lower position, the guides 70 are shown extending through the guide arm plate 60, 62. In this arrangement, the guides 70 inhibit the guide arm plate 60, 62 from moving into a position which the guide arms 50 are bound or locked in some way.

Also shown in this embodiment is an optional feature. In some embodiments, for example large diameter flanges, the flange and pipe may be formed of a plastic material, such as high density polyethylene (HDPE). The embodiment provides a wedge shaped (in section) backing ring 114 which is formed of a metallic material. The metal provides some additional strength along the flange 14 to inhibit damage due to the clamping force. The backing ring may have an angle measured from the horizontal of up to about 20 degrees.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A pipe cap, comprising:
- a plate which is configured to be positioned on a flange;
- a plurality of arcuate segments which expand radially to separate and increase an outer diameter of the plurality of arcuate segments, or which retract radially and decrease the outer diameter of the plurality of arcuate segments;
- a central shaft operably connected to a plurality of guide arms;
- a guide arm plate which moves with said central shaft;
- each of said plurality of guide arms pivotally connected to said guide arm plate, said plurality of guide arms movable with movement of said guide arm plate to radially move each of the plurality of arcuate segments;
- said plurality of arcuate segments being shaped to retain said plate to said flange when said plurality of arcuate segments are retracted.

2. The pipe cap of claim 1, further comprising a connector on an upper surface of each of said plurality of arcuate segments.

3. The pipe cap of claim 1 further comprising an actuator on a surface of said plate.

4. The pipe cap of claim 3, wherein said central shaft is a part of the actuator.

5. The pipe cap of claim 3, wherein said guide arm plate is movable by said actuator toward and away from said plate.

6. The pipe cap of claim 4, wherein when said guide arm plate moves away from said plate, said plurality of arcuate segments move radially inward.

7. The pipe cap of claim 4, wherein when said guide arm plate moves toward said plate, said plurality of arcuate segments move radially outward.

8. The pipe cap of claim 3, wherein said actuator is a linear actuator.

9. The pipe cap of claim 8, wherein said linear actuator is a fluid actuator or a rotating screw actuator.

10. The pipe cap of claim 9, wherein said fluid actuator is a hydraulic actuator.

11. The pipe cap of claim 1, wherein each of said plurality of arcuate segments is channel shaped in cross-section.

12. The pipe cap of claim 1 wherein said plurality of arcuate segments disengage the plate and the flange.

13. The pipe cap of claim 1, wherein said cap retains said plate and may be removed from the flange.

14. A pipe cap, comprising:
- a plate configured to be placed on a pipe flange to close a flow path within a pipe;
- a plurality of channel shaped arcuate segments which move radially inwardly or radially outwardly relative to a peripheral edge of said plate and said pipe flange;
- a central shaft connected to a guide arm plate wherein movement of said central shaft causes movement of said guide arm plate;
- a plurality of guide arms extending from said guide arm plate toward said plurality of channel shaped arcuate segments;
- wherein movement of said central shaft causes radial movement of said plurality of channel shaped arcuate segments.

15. The pipe cap of claim 14, further comprising a linkage plate connected to each of said plurality of channel shaped arcuate segments.

16. The pipe cap of claim 14, further comprising a plurality of rods guiding movement of said guide arm plate.

17. The pipe cap of claim 14, wherein each of said guide arms pivot at a first end and a second end.

* * * * *